United States Patent Office 3,632,511
Patented Jan. 4, 1972

3,632,511
ACYLATED NITROGEN-CONTAINING COMPOSITIONS, PROCESSES FOR THEIR PREPARATION, AND LUBRICANTS AND FUELS CONTAINING THE SAME
Chien-Wei Liao, Beachwood, Ohio, assignor to The Lubrizol Corporation, Wickliffe, Ohio
No Drawing. Filed Nov. 10, 1969, Ser. No. 875,486
Int. Cl. C10m 1/20, 1/32; C101 1/22
U.S. Cl. 252—51.5 A    20 Claims

ABSTRACT OF THE DISCLOSURE

Polycarboxylic acid acylating agents are reacted with alkylene polyamines and the resulting reaction product is then contacted with specified polyhydric alcohols. The final products are useful as additives for lubricants and fuels.

---

This invention relates to novel compositions of matter, processes for their preparation, and the uses of the compositions thus produced. More specifically, this invention relates to novel acylated nitrogen-containing compositions, processes for preparing the M, and the use of these compositions as additives in lubricants and fuels.

Within the past decade, a new class of acylated nitrogen-containing compounds was introduced as dispersant additives for lubricants and fuels. These acylated nitrogen-containing compounds are illustrated by those described in U.S. Pats. 3,172,892, 3,219,666, and 3,272,746. These dispersants have achieved widespread commercial use. Nevertheless, since their introduction there has been a continuing search for ways of improving their dispersancy capabilities and other desirable properties. Thus, these acylated nitrogen compositions have been further reacted with carbon disulfide, lower molecular weight carboxylic acids, alkylene oxides, alkenyl cyanides, boron compounds, and the like. Illustrative of these efforts to improve upon the acylated nitrogen-containing compounds is the work described in such U.S. patents as 3,087,936; 3,184,474; 3,200,107; 3,216,936; 3,254,025; 3,278,550; 3,281,428; 3,282,955; 3,373,111; and the like.

It has now been determined that the class of acylated nitrogen compositions useful as additives in lubricants and fuels and prepared by reacting high molecular weight polycarboxylic acid acylating agents with alkylene polyamides can be improved with respect to their dispersancy and rust resistant properties if the acylated nitrogen composition is prepared in the presence of a stoichiometric excess of high molecular weight polycarboxylic acid acylating agent and the resulting product thereby produced is contacted with at least one specified polyhydric alcohol. Accordingly, it is a principal object of this invention to provide novel acylated nitrogen-containing reaction products, processes for their preparation, and lubricants and fuels containing these nitrogen-containing reaction products.

These as well as other objects of this invention can be achieved by a process comprising reacting at a temperature of at least 80° C. (a) N equivalents of at least one high molecular weight polycarboxylic acid acylating agent containing at least about fifty aliphatic carbon atoms with (b) M equivalents of at least one alkylene polyamine where N is greater than M (i.e., N>M) to produce an acylated alkylene polyamine-containing reaction mixture and then contacting at a temperature of at least 80° C. said reaction mixture with (c) at least N—M equivalents of at least one polyhydric alcohol selected from the class consisting of polyhydric alkanols containing at least three hydroxy groups and polyhydroxy-substituted aliphatic primary amines wherein the ratio M/N is characterized by a numerical value of about 0.1 to about 0.9. The acylated nitrogen-containing reaction products contemplated by the present invention are the reaction products of this process while the lubricants and fuels contemplated are those containing these acylated nitrogen-containing reaction products.

The high molecular weight polycarboxylic acid acylating agents, that is, reactant (a), are well-known in the art and have been described in detail, for example, in U.S. Pats. 3,172,892; 3,219,666; 3,272,746; 3,341,542; and 3,331,022. For the sake of brevity, these prior patents are incorporated herein. One particularly important characteristic of the acylating agent is its size. The acylating agent should contain at least about fifty aliphatic carbon atoms. This limitation is based upon both oil-solubility considerations and the effectiveness of the compositions as additives in lubricants and fuels. Another important characteristic of the acylating agent is that it preferably should be substantially saturated, i.e., at least about 95% of the total number of the carbon-to-carbon covalent linkages therein should be saturated linkages. In an especially preferred aspect of the invention, at least about 98% of these covalent linkages are saturated. Obviously, all may be saturated. A greater degree of unsaturation renders the acylated nitrogen-containing reaction products more susceptible to oxidation, degradation, and polymerization and this lessens the effectiveness of the products as lubricant and fuel additives.

In addition, the acylating agents should be substantially free from oil-solubilizing pendant groups, that is, groups having more than about six aliphatic carbon atoms. Although, some such oil-solubilizing pendant groups may be present, they preferably will not exceed one such group for every twenty-five aliphatic carbon atoms in the principal hydrocarbon chain of the acylating agent. The acylating agent may contain polar substituents. Typical polar substituents are halo, such as chloro and bromo, oxo, oxy, formyl, sulfonyl, sulfinyl, thio, nitro, etc. Such polar substituents, if present, preferably will not exceed 10% by weight of the total weight of the hydrocarbon portion of the carboxylic acid radical excluding the weight of the carboxylic acid groups, e.g.,

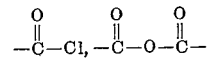

etc.

As disclosed in the foregoing patents, there are several processes for preparing the acylating agents. Generally, these processes involves the reaction of (1) an ethylenically unsaturated carboxylic acid, acid halide, anhydride, or equivalent acidic reactant with (2) an ethylenically unsaturated hydrocarbon containing at least about fifty aliphatic carbon atoms or a chlorinated hydrocarbon containing at least fifty aliphatic carbon atoms at a temperature within the range of about 100°–300° C. The chlorinated hydrocarbon or ethylenically unsaturated hydrocarbon reactant can, of course, optionally contain polar substituents, oil-solubilizing pendant groups, and be unsaturated within the general limitations explained herein above and in the incorporated patents.

When preparing the carboxylic acid acylating agent according to one of these two processes, the acidic reactant usually corresponds to the formula R—(COOH)$_n$, where R is characterized by the presence of at least one ethylenically unsaturated carbon-to-carbon covalent bond and $n$ is an integer from two to six and preferably two.

The acidic reactant can also be the corresponding carboxylic acid halide, anhydride, ester, or other equivalent acylating agent and mixtures of one or more of these. Ordinarily, the total number of carbon atoms in the acidic reactant will not exceed ten and generally will not exceed six. Preferably the acidic reactant will have at least one ethylenic linkage in an $\alpha,\beta$-position with respect to at least one carboxyl function. Exemplary acidic reactants are maleic acid, maleic anhydride, fumaric acid, itaconic acid, itaconic anhydride, citraconic acid, citraconic anhydride, mesaconic acid, glutaconic acid, chloromaleic acid, aconitic acid, and the like.

The ethylenially unsaturated hydrocarbon or polar substituted hydrocarbon reactant, including the chlorinated reactants, used in the preparation of the acylating agents are principally the high molecular weight, substantially saturated petroleum fractions and substantially saturated olefin polymers and the corresponding chlorinated products. The polymers and chlorinated polymers derived from mono-olefins having from two to about thirty, preferably two to eight, carbon atoms are preferred. Especially useful are the polymers and chlorinated polymers of 1-mono-olefins such as ethylene, propene, 1-butene, isobutene, 1-hexene, 1-octene, 2-methyl-1-heptene, 3 - cyclohexyl - 1-butene, and 2-methyl-5-propyl-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic substituted olefins, cyclic olefins, and polyolefins, are also useful sources of the ethylenically unaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons noted above, the substituted hydrocarbons and hydrocarbons contemplated for use in preparing the acylating agents should be substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

The chlorinated hydrocarbons and ethylenically unsaturated hydrocarbons used in the preparation of the acylating agents can have molecular weights of from about 700 up to about 100,000 or even higher. The preferred materials for preparing the acylating agents are the above-described polyolefins and chlorinated polyolefins having an average molecular weight of about 700 to about 5,000. When the acylating agent has a molecular weight in excess of about 10,000, the acylated nitrogen compositions also possess viscosity index improving qualities.

In lieu of the high molecular weight hydrocarbons and chlorinated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, carbonyl, and formyl radicals. Examples of these polar-substituted hydrocarbons include polypropene sulfide, di-polyisobutene disulfide, nitrated mineral oil, di-polyethylene sulfide, brominated polyethylene, etc.

As is apparent from the foregoing, the high molecular weight carboxylic acid acylating agents may contain cyclic and/or aromatic groups. However, the acids are essentially aliphatic in nature and in most instances, the preferred acylating agents are aliphatic polycarboxylic acids, anhydrides, and halides, especially chlorides. The selection of a suitable acylating agent is obviously within the skill of the art, however.

The substantially saturated aliphatic hydrocarbon-substituted succinic acids and anhydrides are especially preferred as acylating agents in the preparation of the acylated nitrogen-containing products of the present invention. These succinic acid acylating agents are readily prepared by reacting maleic anhydride with a high molecular weight olefin or a chlorinated hydrocarbon such as a chlorinated polyolefin. The reaction involves merely heating the two reactants at a temperature of about 100°–300° C., preferably, 100°–200° C. The product from such a reaction is a substituted succinic anhydride where the substituent is derived from the olefin or chlorinated hydrocarbon as described in the above cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid. Other high molecular weight polycarboxylic acid acylating agents can be prepared by replacing all or a portion of the maleic anhydride with another acidic reaction of the formula $R—(COOH)_n$ where R and $n$ are as described above.

The acylating agents may also be prepared by halogenating a high molecular weight hydrocarbon such as the above described olefin polymers to produce a poly-halogenated product, converting the poly-halogenated product to a poly-nitrile, and then hydrolyzing the poly-nitrile. They may be prepared by oxidation of a high molecular weight polyhydric alcohol with potassium permanganate, nitric acid, or a similar oxidizing agent. Another method for preparing polycarboxylic acid acylating agents involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

High molecular weight polycarboxylic acid acylating agents can also be obtained by reacting chlorinated polycarboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in 3,340,281.

Polycarboxylic acid anhydrides are obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid radicals separated by no more than three carbon atoms such as substituted succinic or glutaric acid, whereas linear anhydrides are obtained from polycarboxylic acids having the acid radicals separated by four or more carbon atoms.

The acid halides of the polycarboxylic acids can be prepared by the reaction of the acids or their anhydrides with a halogenating agent such as phosphorus tribromide, phosphorous pentachloride, or thionyl chloride in the conventional manner.

The alkylene polyamine reactants correspond for the most part to the formula

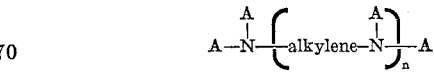

wherein $n$ is an integer of from one to ten, A is a hydrocarbon group, substantially hydrocarbon group, or hydrogen and the alkylene radical is a straight or branched chain alkylene radical having up to seven carbon atoms therein. These alkylene polyamines include methylene polyamines, ethylene polyamines, propylene polyamines, butylene polyamines, pentylene polyamines, hexylene polyamines, heptylene polyamines, and the analogous cyclic alkylene polyamines such as piperazines, homopiperazines, N - (aminoalkyl) - piperazines, N,N'-di(aminoalkyl)-piperazines and the like. These alkylene polyamines are exemplified by ethylene diamine, triethylene tetramine, propylene diamine, octamethylene diamine, tripropylene tetramine, tetraethylene pentamine, pentaethylene hexamine, trimethylene diamine, di(trimethylene)-triamine, 1-(2-aminopropyl)-piperazine, 1,4-bis(2 - aminoethylene)-piperazine, and 2 - methyl - 1 - (2-aminobutyl)-piperazine.

In the above formula, the A variables are usually hydrogen (at least one must be hydrogen or a substituent containing a primary or secondary amino nitrogen) although they can represent other groups such as lower alkyl, hydroxy-lower alkyl, amino-lower alkyl, lower alkoxy-substituted lower alkyl, and the like wherein the alkyl groups thereof contain from one to seven carbon atoms. The alkylene groups preferably will be straight or branched chain groups containing two to four carbon atoms. Examples of such polyamines include N-(2-hydroxyethyl)-ethylene diamine, N,N'-bis(2-hydroxyethyl)-ethylene diamine, 1-(2-hydroxy-ethyl)-piperazine, monohydroxypropyl-substituted diethylene triamine, 1,4-bis(2-hydroxypropyl) - piperazine, N-(3-hydroxypropyl)-tetramethylene diamines, N-isobutyl-ethylene diamine, N-(ethyl) - hexamethylene diamine, $N^3$ - aminoethyl-octaethyleneonamine, and the like.

Within the class of alkylene polyamines, the ethylene polyamines of the formula

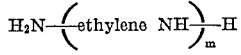

wherein $m$ is a whole number of from one to ten and, preferably $m$ has an average value of from about two to seven are especially useful. Ethylene polyamines are described in detail under the heading "Ethylene Amines" in the Encyclopedia of Chemical Technology, Kirk and Othmer, vol. 5, pages 898–905, (1950), and "Diamines and Higher Amines, Aliphatic" in Encyclopedia of Chemical Technology, (2nd ed.), Kirk and Othmer, vol. 7, page 22–39 (1965), both by Interscience Publishers, New York. Ethylene polyamines can be prepared conveniently by the reaction of ethylene chloride and ammonia or the reaction of ethanolamine and ammonia under pressure in the presence of hydrogenation catalyst according to known procedures. These reactions usually result in the production of complex mixtures of ethylene polyamines including cyclic polyamines such as piperazines, aminoethyl piperazines, and the like. See U.S. Pat. 3,251,664. Such mixtures are useful in the preparation of the acylated nitrogen-containing products contemplated herein. Of course, pure ethylene polyamines can be used but mixtures normally will be used since they are readily available commercially in large quantities.

The polyhydric alcohols useful as reactant (c) are the alkane polyols containing at least three hydroxy groups and polyhydroxy-substituted aliphatic primary amines, either of which may contain up to about twenty carbon atoms and up to about ten hydroxy groups. Preferred polyhydric alkanols are those containing from three to six hydroxy groups and up to seven carbon atoms, such as glycerol, β-hydroxymethyl-2-methyl-propanediol-1,3 (i.e., trimethylolethane or TME), 2-hydroxymethyl-2-ethyl-propanediol-1,3 (i.e., trimethylolpropane or TMP), 1,2,4-butanetriol, 1,2,6-hexanetriol, 1,2,3-pentanetriol, 1,2,3-hexanetriol, 1,2,5-hexanetriol, 2,3,4-hexanetriol, erythritol, pentaerythritol, arabitol, xylitol, adonitol, sorbitol, mannitol, and the like. Within the class of preferred alcohols the branched chain polyhydric alkanols, (e.g., TMP, TME, pentaerythritol, etc.) are especially preferred as are polyhydric alkanols containing at least four hydroxy groups (e.g., pentaerythritol, erythritol, threitol, ribitol, xylitol, arabitol, sorbitol, mannitol, etc.).

The hydroxy-substituted primary amines useful as reactant (c) correspond to the general formula $R_a$—$NH_2$ where $R_a$ is a monovalent organic radical containing at least two alcoholic hydroxyl groups, an alcoholic hydroxyl group being one not attached to a carbon atom forming part of an aromatic nucleus. Ordinarily the total number of carbon atoms in $R_a$ will not exceed about twenty. Hydroxy-substituted aliphatic primary amines containing a total of up to about ten carbon atoms are particularly useful. Especially preferred are the polyhydroxy-substituted alkanol primary monoamines wherein there is only one amino group present (i.e., a primary amino group) having one alkyl substituent containing up to ten carbon atoms and up to six hydroxyl groups. These especially preferred alkanol primary amines correspond to $R_a$—$NH_2$ where $R_a$ is a mono- or polyhydroxy-substituted alkyl group. It is desirable that at least one of the hydroxyl groups be a primary alcoholic hydroxyl group.

In addition to the alcoholic hydroxyl substituents, $R_a$ can contain other primary, secondary, or tertiary amino substituents, e.g., lower alkyl amino groups, di-lower alkyl amino groups, hydroxy-substituted lower alkyl amino groups, di(hydroxy-substituted)-lower alkyl amino groups, etc. Moreover $R_a$ can contain one or more interrupting groups such as

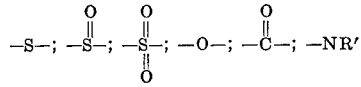

where R' is hydrogen or lower alkyl; and —NR''— where R'' is a group of the formula

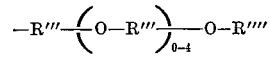

where R''' is alkylene of up to seven carbon atoms and R'''' is hydrogen, lower alkyl, or hydroxy lower alkyl. Thus, reactant (c) can be a hydroxy-substituted alkylene polyamine of the formula

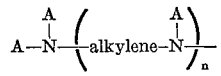

wherein A and $n$ are as defined hereinbefore with the proviso that at least one amino group per molecule must be a primary amino group and the remaining A's must be such that there are at least two alcoholic hydroxy groups present per molecule. Hydroxy-substituted primary amines are known to those skilled in the art or can be prepared according to conventional procedures known in the art. Illustrative examples of polyhydroxy-substituted primary monoamines include 2-amino-2-methyl-1,3-propanediol, 2-amino-2-ethyl - 1,3 - propanediol, tris(hydroxymethyl) aminomethane (also known as trismethylolaminomethane), glucamine, glucosamine, N,N-di-(β-hydroxyethyl)-ethylenediamine, $N^1$,$N^2$-di-(β-hydroxypropyl) - diethylenetriamine, and the like.

Before describing the processes by which the acylated nitrogen-containing reaction products contemplated by this invention are prepared, it is necessary to describe what is intended by the term "equivalent" with respect to the reactants described hereinabove. For purposes of the present specification and claims, the number of equivalents present in a high molecular weight polycarboxylic acid acylating agent depends upon the number of carboxy groups, i.e., —COOH, or their equivalents, e.g.,

etc., present in the acylating agent. For example, a dicarboxylic acid acylating agent such as a polyolefin-substituted succinic acid or succinic acid anhydride contains two equivalents per mole while a tricarboxylic acid would contain three equivalents per mole. The number of equivalents in the alkylene polyamines depends upon the number of —NH— groups present in the molecule. For example, ethylenediamine, propylenediamine, tetramethylenediamine, and the like have two equivalents per mole while tetraethylene pentamine has five equivalents per mole. N-aminoethyl-piperazine has two equivalents per mol. Since, as a practical matter, mixtures of alkylene polyamines are usually employed as the alkylene polyamine reactant, it is not usually known what specific alkylene polyamines and how much of each are actually present. Accordingly, for purposes of the present specification and claims, the number of equivalents of amine in these alkylene polyamine mixtures is directly proportional to the nitrogen content. That is, these alkylene polyamine mixtures are regarded as having one equivalent per nitrogen atom. Accordingly, the number of equivalents in any given alkylene polyamine mixture is readily ascertained simply by determining the nitrogen content of the particular alkylene polyamine mixture. The number of equivalents present in the polyhydric alcohols depends upon the number of alcoholic hydroxyl groups present. Thus, glycerol, TMP, TME, and trismethylolaminomethane i.e.,

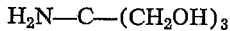

$$H_2N-C-(CH_2OH)_3$$

have three equivalents per mole, pentaerylthritol has four equivalents per mole, sorbitol and mannitol have six equivalents per mole, and the like. Obviously, if mixtures of various acylating agents, alkylene polyamines, and polyhydric alcohols are employed as reactants, the equivalent weight of the particular mixture will depend upon the identity and amount of the components present therein.

As stated above, the acylated nitrogen-containing reaction products of the present invention are prepared in a two-step process. First, N equivalents of at least one high molecular weight polycarboxylic acid acylating agent is reacted with M equivalents of at least one alkylene polyamine by contacting the acylating agent and the alkylene polyamine at a temperature of at least about 80° C. There is no upper limit on the temperature of this reaction except as inherently imposed by the decomposition temperature of the particular reactants involved and the reaction products. Ordinarily, however, there is no need to exceed 300° C. and the reaction is preferably carried out at a temperature within the range of 100°–260° C. The amount of high molecular weight polycarboxylic acid acylating agent and alkylene polyamine is such that the number of equivalents of the acylating agent exceeds the number of equivalents of alkylene polyamine (i.e., N is greater than M) by such an amount that the ratio of M to N (i.e., $M/N$) has a numerical value of about 0.1 to about 0.9. Or, stating this ratio in a different manner, the ratio of equivalents of polycarboxylic acylating agents to equivalents of alkylene polyamine is from about 1.0:0.1 to about 1.0:0.9. Preferably the ratio $M/n$ is characterized by a numerical value of about 0.2 to about 0.8.

Because of the polyfunctional character of both the acylating agent and the alkylene polyamine, a mixture of acylated nitrogen-containing reaction products is contained in the first reaction mixture produced according to the first step in the process. Thus, the reaction product may contain various amides, imides, amidines, or mixtures of these. However, the exact nature of this acylated nitrogen-containing first reaction products is not critical to this invention since all of these products possess the desired dispersant characteristics and can be used in the second step of the process.

While not necessary, it is usually desirable to conduct the first stage of the two-step process in the presence of a substantially inert diluent such as liquid hydrocarbons and halo hydrocarbons, ethers, and the like. The diluents facilitate temperature control and further processing and handling of the reaction products. Specific substantially inert liquid diluents suitable for use in this process include mineral oils, naphthas, benzenes, toluenes, xylenes, chlorobenzenes, heptane, hexane, pentane, cycloheptane, cyclohexane, chlorohexane, butyl ether, isobutyl ether, amyl ether, isoamyl ether, methyl amyl ether, dimethyl formamide, dimethylacetamide, dimethylsulfoxide, and mixtures of two or more of these. It is also contemplated that inert atmospheres (e.g., nitrogen, helium, etc.) and super atmospheric or subatmospheric pressures can be utilized as desired.

The first step in the process is usually permitted to continue until all further chemical reaction substantially ceases. Depending on the amount and identity of the particular reactants, the presence or absence of diluents, the reaction temperature, and the other usual parameters of chemical reaction duration, this will generally require from about one-half hour to about 48 hours, usually 3–24 hours. However, it is within the skill of the art to determine when reaction substantially ceases by such conventional indicators as the cessation in the evolution of water and other by-products formed in reaction, periodic determination of the acidity until a point is reached when further change in the acidity substantially ceases, and the like.

Upon completion of the first step in the process, the resulting reaction mixture including the diluent present, if any, can be immediately subjected to the second stage in the process, that is, the contacting of the acylated nitrogen-containing first reaction product with the polyhydric alcohols at a temperature of at least 80° C. It is also contemplated however, that the first reaction mixture can be subjected to conventional purification techniques such as filtration, distillation, centrifugation, and the like prior to the second step. Moreover, the second step can be performed as part of a continuous operation or it can be done in a batch-wise manner.

The second step in the process need not be carried out immediately but can be postponed as desired. All that is required to carry out the second step is to intimately contact the first reaction mixture with the polyhydric alcohol at a temperature of at least about 80° C. Again, there is no upper limit on the temperature for the second step except for the inherent limitations imposed by the decomposition temperature of the reactants and the final products. Ordinarily the temperature will not exceed 300° C. and preferably will be in the range of 100° C. to 260° C.

The amount of polyhydric alcohol employed will be such as to provide at least that number of equivalents of alcohol corresponding to the theoretical number of equivalents of unreacted high molecular weight polycarboxylic acid acylating agent remaining after completion of the first step in the process, that is, $N-M$. Usually, there is no advantage in using more than one mole of polyhydric alcohol for each equivalent of unreacted acylating agent although larger excesses, e.g., up to two or three moles may be employed if desired.

The second step in the process should be conducted for a period of time sufficient for at least a portion of the polyhydric alcohol to react with unreacted carboxylic acid functions in the high molecular weight polycarboxylic acid acylating agents. Such reaction will be reflected in a reduction in the acidity of the reaction mixture. Preferably the reaction will continue until further chemical reaction substantially ceases. Generally, depending on the identity of the particular reactants and the volumes of materials, reaction temperature, and other reaction parameters, this will require from about 30 minutes to about 48 hours, usually 3–24 hours.

The exact nature of the acylated nitrogen-containing reaction products produced according to the second step is not known. The polyhydric alcohols presumably enter into an esterification reaction. If the polyhydric alcohol contains a primary amino group, the amine can enter into the formation of additional amide, imide, or amidine groups or mixtures of these. Due to the many reactive cites present in both steps of the process, it is to be expected that some crosslinking also occurs. Obviously, the best way to describe such complex reaction products is in terms of the processes by which they are produced.

As in the first step, the presence of a diluent is not necessary in the second step of the process. However, a diluent does facilitate temperature control and further processing as discussed above. Those diluents useful in the first step of the process are also suitable in the second step. Accordingly, if a diluent was used in the first step, it can remain in the first reaction mixture and serve as a diluent in the second step of the reaction or a diluent can be added at the beginning of the second step, if desired.

Upon completion of the second step of the reaction, the acylated nitrogen-containing reaction products are usually subjected to conventional purification techniques such as filtration, centrifugation, distillation, and the like, before incorporating them into a lubricant or fuel. Generally, the material is filtered before use in lubricants and fuels.

In carrying out the process of this invention it is not necessary that the total quantity of each reactant be initially incorporated into the reaction mixture. That is, the reactants can be brought together continuously over a period of time, a portion of one or more of the reactants can be added intermittently during the course of the reaction, or the reactants can be mixed together prior to commencing heating. For example, in the first step of the reaction, the high molecular weight polycarboxylic acid and the alkylene polyamine can be mixed and heated; the acylating agent can be added continuously to the alkylene polyamine during the course of the reaction or vice versa; or both materials can be added intermittently to the reaction mixture over a period of time; etc. The same situation prevails with respect to the second step of the process. For example, the polyhydric alcohols can be added to the first reaction mixture at one time, or in increments intermittently during the reaction.

The following examples describe in detail preferred embodiments of the present invention. Unless otherwise indicated, all reference to percentages and parts in the present specification and claims, including the following examples, refer to percent by weight and parts by weight.

EXAMPLE 1

(a) A mixture comprising 196 parts of mineral oil diluent, 280 parts (0.5 equivalent) of polyisobutenyl-substituted succinic anhydride having an average molecular weight of about 1100, and 15.4 parts (0.375 equivalent) of a commercial ethylene polyamine mixture having a nitrogen content of about 34.25% ($M/N$=0.75) is heated to about 150° C. over a five-hour period and maintained at a temperature of about 150°–155° C. for an additional five hours with nitrogen blowing to assist in the removal of water formed during the reaction. Thereafter this first reaction mixture is filtered. This first filtrate is a 40% oil solution of acylated nitrogen-containing reaction products and is characterized by a nitrogen content of about 1.1%.

A mixture comprising 953 parts of the above filtrate, 11.3 parts of sorbitol, and 180 parts xylene is heated for eight hours while maintaining a temperature of 180°–185° C.

Thereafter the mixture is stripped to 185° C. and a pressure of 12 mm. (Hg) over a three-hour period. Then 20 parts mineral oil diluent are added and the resulting mixture filtered. This final filtrate is a 40% oil solution of the desired acylated nitrogen-containing compounds of the type contemplated by the present invention. It is characterized by a nitrogen content of about 1.1%.

(b) The general procedure of 1(a) is repeated using 1030 parts of the first filtrate of 1(a) and 25 parts of sorbitol. The final filtrate is a 40% oil solution characterized by a nitrogen content of about 1.1% and an OH content of about 1.06%.

(c) The general procedure of 1(a) is repeated using 34 parts of sorbitol in lieu of the 11.3 parts of sorbitol employed in 1(a). The final filtrate is a 40% oil solution characterized by a nitrogen content of about 1.1%.

(d) The general procedure of 1(a) is repeated using 1009 parts of the first filtrate and 48.3 parts of sorbitol. The final filtrate is a 40% oil solution of the desired acylated nitrogen-containing reaction products characterized by a nitrogen content of about 1% and an OH content of 1.72%.

In each of 1(a)–1(d) N is greater than M. The amount of sorbitol employed in the second step is such that the ratio of unreacted equivalents of carboxylic acid acylating agent to equivalents of alcohol is 1:1.5; 1:3; 1:4.5; and 1:6. Or, the ratio of equivalents of unreacted carboxylic acid to moles of alcohol is 1:0.25; 1:0.5; 1:0.75; and 1:1, respectively.

EXAMPLE 2

(a) A mixture comprising 1490 parts of a first filtrate produced according to step one in Example 1(a), 34.2 parts of TME, i.e., $CH_3C(CH_2OH)_3$, 180 parts xylene, and 26 parts mineral oil diluent is heated to a temperature of about 190°–210° C. for six hours and thereafter stripped to a temperature of 158° C. and a pressure of 20 mm. (Hg). The stripped material is then filtered, this final filtrate being a mineral oil solution of the desired acylated nitrogen-containing compounds contemplated by the present invention. The filtrate is characterized by a nitrogen content of about 1.11%.

(b) The process of 2(a) above is repeated substituting an equivalent amount of TMP, i.e., $CH_3CH_2C(CH_2OH)_3$, for the TME. The final filtrate is a 40% oil solution of the desired acylated nitrogen-containing compounds and is characterized by a nitrogen content of about 1.08%.

In both 2(a) and 2(b) the ratio of equivalents of unreacted acylating agent to polyhydric alcohol is 1:3.

EXAMPLE 3

A reaction mixture comprising 800 parts of the first filtrate produced according to step one of Example 1(a) above, 28.6 parts of pentaerythritol, 135 parts xylene, and 20 parts of mineral oil diluent are heated to a temperature within the range of 175° C. to 230° C. for six hours and thereafter stripped to 175° C. at 20 mm. (Hg) over a three-hour period and filtered. The final filtrate is a 38.8% mineral oil solution of the desired acylated nitrogen-containing compound and is characterized by a nitrogen content of about 1.06% and an OH content of about 1.16%.

In this example, the ratio of unreacted equivalents of acylating agent to polyhydric alcohol is about 1:4. Analysis of the reaction products indicates that about 84% of the pentaerythritol is incorporated into the final reaction products.

EXAMPLE 4

A mixture comprising 800 parts of the first filtrate produced according to the procedure described in Example 1(a) above, 25.4 parts trismethylolaminomethane, i.e., $H_2NC(CH_2OH)_3$, 180 parts xylene, and 15 parts mineral oil diluent are heated at a temperature within the range of 140°–146° C. for eight hours, during which time 4.5 parts water is removed. The resulting material is stripped to 187° C. at a pressure of 10 mm. (Hg) and filtered. This final filtrate is a 40% oil solution of the desired acylated nitrogen-containing reaction products and is characterized by a nitrogen content of about 1.39% and an OH content of about 1.22%.

In this example, the ratio of equivalents of unreacted acylating agent to equivalents of polyhydric alcohol is 1:3.

EXAMPLE 5

(a) A mixture comprising 1849 parts of a substituted succinic acid anhydride prepared by reacting chlorinated polyisobutylene with maleic anhydride according to conventional techniques as described in U.S. 3,172,892 and 3,219,666 and 1286 parts of oil is heated from room temperature to 125° C. and thereafter 104 parts of a mixture of commercially available polyethylene polyamine mixtures characterized by a nitrogen content of about 34% is added while maintaining a temperature of 125° C. over a 45-minute period. ($M/N=0.75$.) The resulting mixture is then heated within the range of 125°–165° C. for three hours while blowing the mixture with nitrogen to assist in the removal of 14 parts water. A sample of the reaction mixture titrated at this point titrated to the phenolphthalein end point indicates that 12 milligrams of potassium hydroxide would be required to neutralize the acidity of one gram of the reaction mixture.

To this first reaction mixture maintained at about 150° C. there is slowly added 94 parts of pentaerythritol over a one-quarter hour period. The resulting mixture is heated at 200°–222° C. for 12.5 hours with nitrogen blowing during which 6.2 parts of water are removed. Then 51 parts of mineral oil diluent are added and the resulting mass filtered. The final filtrate is a 40% oil solution of the desired acylated nitrogen-containing reaction products characterized by a nitrogen content of about 1.07% and an OH content of about 1.16%. Analysis of the reaction products indicates that about 93% of the pentaerythritol is incorporated into the product.

In this example, the ratio of equivalents of unreacted carboxylic acid acylating agent to equivalents of polyhydric alcohol is 1:4.

(b) A mixture comprising 4616 parts of the succinic acid anhydride and 170 parts of the alkylene polyamine mixture as described in Example 5(a) ($M/N=0.5$), 3143 parts of mineral oil diluent, and 1128 parts of toluene, are heated for five hours at 115°–139° C. during which time 32 parts water are removed. The reaction mixture is then stripped to a temperature of 187° C. at a pressure of 15 mm. (Hg) and filtered. This first filtrate is a 40% oil solution of the acylated nitrogen-containing reaction products to be used as intermediates in the second step of the process. It is characterized by a nitrogen content of about 0.7%.

A mixture comprising 2559 parts of the above first filtrate, 138 parts of pentaerythritol, 79 parts of mineral oil diluent, and 180 parts of xylene, are heated for eleven hours at 192°–220° C. during which time 18 parts of water are removed. The resulting mixture is then stripped to a temperature of 203° C. at a pressure of 11 mm. (Hg) and filtered. The final filtrate is a 40% oil solution of the desired acylated nitrogen-containing reaction products of this invention and is characterized by a nitrogen content of 0.67%.

In this example, the ratio of equivalents of unreacted acylating agent N–M to equivalents of polyhydric alcohol is 1:4.

(c) Following the general procedure of Example 5(a), 2240 parts of the acylating agent (4.0 equivalents) and 55.4 parts (1.33 equivalents) of the alkylene polyamine described therein ($M/N=0.33$). in 360 parts of toluene diluent are heated at 168° C. for 3.5 hours during which time 12.5 parts of water are removed. Titration of a sample of this first reaction mixture at this point to the phenolphthalein end point indicates that 34 milligrams of potassium hydroxide would be required to neutralize the acidity in one gram. Then 299 parts (8.72 equivalents) of pentaerythritol and 315 parts of xylene are added to the first reaction mixture and the resulting mixture is heated to a 190°–220° C. for seventeen hours during which time 37 parts of water are removed. The mixture is then stripped to 156° C. at 28 mm. (Hg) and filtered. The filtrate is a 40% oil solution of the desired acylated nitrogen-containing reaction products and is characterized by a nitrogen content of 0.49%.

In this example, the ratio of equivalents of unreacted carboxylic acid acylating agent to equivalents of polyhydric alcohol is 1:4.

(d) A mixture comprising 1925 parts (3.5 equivalents) of the acylating agent and 29 parts (0.7 equivalent) of the alkylene polyamine of Example 5(a) ($M/N=0.2$) in 1294 parts mineral oil diluent and 450 parts xylene is heated for ten hours at 150°–188° C. during which time 8.5 parts of water are removed. Then, 310 parts (9 equivalents) of pentaerythritol and 246 parts mineral oil diluent are added and the resulting mixture is heated for thirty-five hours at 160°–240° C. during which time 38 parts of water are removed. Then this reaction mixture is filtered producing a final filtrate which is a 40% mineral oil solution of the desired acylated nitrogen-containing products characterized by a nitrogen content of 0.26% and an OH content of 2.12%. Analysis of the product indicates that 93% of the pentaerythritol is incorporated into the final product.

In this example, the ratio of equivalents of unreacted acylating agent to equivalents of polyhydric alcohol is 1:4.

EXAMPLE 6

A mixture comprising 1250 parts of the first filtrate produced according to step one in Example 5(b), 60 parts of trismethylolaminomethane, i.e., $H_2NC(CH_2OH)_3$, 34 parts mineral oil diluent, and 135 parts of xylene is heated to about 200° C. for three hours during which time 14 parts water is removed. The mixture is then stripped to 176° C. at a pressure of 10 mm. (Hg) and filtered. The final filtrate is a 40% oil solution of the desired acylated nitrogen-containing reaction products characterized by nitrogen content of 0.96%.

In this example, the ratio of equivalents of unreacted acylating agent to equivalents of polyhydric alcohol is 1:3.

EXAMPLE 7

(a) A mixture comprising 2240 parts (4.0 equivalents) of a succinic acid anhydride prepared according to Example 5(a) above, 108 parts (2.5 equivalents) of a mixture of ethylene polyamines having a nitrogen content of 33.3% ($M/N=0.625$), 1550 parts of mineral oil diluent, and toluene are heated for nine hours at 110°–150° C. during which time 23 parts of water are removed. The reaction mixture is then stripped to 170° C. at a pressure of 30 mm. (Hg) and filtered. The first filtrate has a nitrogen content of 1.02%.

Then, 875 parts of the first filtrate, 34 parts (1 equivalent) of pentaerythritol, 19 parts mineral oil diluent, and 180 parts xylene are heated for five hours at 157°–215° C. during which time 4.5 parts of water are removed. The resulting mixture is then stripped to a 220° C. at a pressure of 28 mm. (Hg) and filtered. The final filtrate is a 40% oil solution of the desired acylated nitrogen-containing reaction products characterized by a nitrogen content of 0.99% and an OH content of 1.16%.

The ratio of equivalents of unreacted acylating agent to equivalents of alcohol in this example is 1:4.

(b) A mixture comprising 875 parts of the filtrate produced according to step one in Example 7(a) above, 30.3 parts of trismethylolaminomethane, 180 parts xylene, and 17 parts mineral oil diluent are heated at 190° C. for six hours during which time 7.5 parts water is removed. The product is then stripped to 160° C. at a pressure of 15 mm. (Hg) and filtered. The final filtrate is a 40% oil solution of the desired acylated nitrogen-containing reaction products having a nitrogen content of 1.33% and an OH content of 1.15%.

The foregoing examples illustrate preferred embodiments of this invention. However, it is contemplated that other reactants, i.e., acylating agents, alkylene polyamines, and polyhydric alcohols as described hereinbefore, will be substituted for all or a portion of the corresponding reactant in the foregoing illustrative examples to produce still other embodiments of the invention. These other reactants can be substituted on an equivalent basis or according to the general overall ratio of reactants as described above. Thus, for the succinic acid anhydride of Example 1(a), there can be substituted an equivalent amount of a tricarboxylic acid prepared by the reaction of a brominated poly(1-hexene) having a molecular weight of 2000 and a bromine content of 4% by weight with 2-pentene-1,3,5-tri-carboxylic acid (prepared by dehydration of citric acid by conventional techniques) at 150° C. for about twenty hours in about a 1:1 mole ratio of brominated polyhexene to acid. Similarly an equimolar mixture of TME and TMP can be substituted on an equivalent basis for the pentaerythritol used in Example 5(a)–(d). Likewise, mannitol can be substituted on an equivalent basis for all or a portion (e.g., one-third) of the trismethylolaminomethane used in Examples 4, 6, and 7(b). Other such variations will be apparent to those skilled in the art.

Standard tests have demonstrated the superior dispersancy capabilities of the acylated nitrogen-containing reaction products of this invention. For example the acylated nitrogen-containing reaction product of Example 2(a) is characterized by a dispersancy rating of 115 and only 17 mg. of sludge is recoverable in an Enarco test. The dispersancy rating is based on the assignment of a dispersancy rating of 100 to a commercial polyisobutenyl-substituted succinic acid anhydride-ethylene polyamine reaction product. The less the amount of filterable sludge, the greater is the dispersancy of the evaluated material. The final products of Examples 7(a) and (b) are characterized by dispersancy ratings of 128 and 122 and produce 1 mg. and 5 mg. of filterable sludge, respectively.

Similarly, in the Sunstrand Pump tests, kerosene containing the final acylated nitrogen-containing reaction products in ratio of ten pounds of the final filtrates prepared according to the general procedures of Examples 2(a), 3, 4, 5(c), 7(a), and 7(b) per thousand barrels of fuel is characterized by a reduction in the amount of screen deposits of 95.7%, 97.3%, 94.9%, 61.9%, 87.1%, and 98.5% respectively, relative to the amount of screen deposits in the absence of a dispersant.

As mentioned before, the acylated nitrogen-containing reaction products of this invention are useful as additives in lubricants and fuels. When employed as lubricating oil additives they are usually present in amounts of from about 0.01% to about 30% by weight in the final lubricating composition. Ordinarily, they will be present in amounts of from about 0.5% to about 10% by weight although under unusually adverse conditions, such as in the operation of certain marine diesels, they may comprise up to about 30% by weight of the lubricant. The products are particularly useful as dispersants in lubricating oil compositions used in the crankcase of various internal combustion engines, although they can be used effectively in gear and transmission lubricants, hydraulic fluids, and the like. When employed in lubricating oils, these may be used alone or in combination with other dispersants or detergents. In addition, the lubricating composition may contain rust inhibitors, oxidation inhibitors, viscosity index improving agents, extreme pressure additives, and the like. Typical examples of these additional additives are contained in the above-identified patents which have been previously incorporated herein by reference.

The acylated nitrogen-containing reaction products of this invention can be effectively employed in a variety of lubricating compositions based on natural or synthetic lubricating oils or on combinations of miscible or mutually soluble natural and synthetic oils. The term "miscible" is intended to describe the situation where the oils are soluble in each other whereas the terminology "mutually soluble" is intended to describe a situation where a suitable common solvent, perhaps another lubricating oil, permits the use of two or more lubricating oils in combination where they would not otherwise normally be satisfactory for a combination use due to solubility problems. The lubricating compositions contemplated are principally lubricating oils for both spark-ignition and compression-ignition internal combustion engines. However, other lubricating compositions can benefit from the incorporation of these additives including lubricants for automatic transmissions, gear lubricants, metal-working lubricants, and hydraulic fluids. While the above lubricating compositions are normally liquids, it is also anticipated that they may be converted to "thickened" lubricants or greases for specific applications by application of conventional grease-forming procedures without departing from the scope of this invention.

Natural oils include castor oil, lard oil, and solvent-refined or acid-refined mineral lubricating oils of the paraffinic, naphthenic, or mixed paraffinic-naphthenic types. Oils of lubricating viscosity derived from coal or shale are also useful base oils. Other synthetic lubricating oils include hydrocarbon oils such as polymerized olefins (e.g., polybutylenes, polypropylenes, etc.); alkyl benzenes (e.g., dodecyl benzenes, tetradecyl benzenes, dinonyl benzenes, di-(2-ethylhexyl) benzenes, etc.); polyphenyls (e.g., biphenyls, terphenyls, etc.); and the like. Alkylene oxide polymers and derivatives thereof where the terminal hydroxyl groups have been modified by esterification, etherification, etc., constitute another class of known synthetic lubricating oils. These are exemplified by the oils prepared through polymerization of propylene oxide, the alkyl and aryl ethers of these polyoxyalkylene polymers (e.g., methylpolyisopropylene glycol ether having an average molecular weight of 1000, diphenylether of polyethylene glycol having a molecular weight of 500–1000, diethylether of polypropylene glycol having a molecular weight of 1000–1500, etc.) or the lower alkanoyl esters thereof such as the acetic esters. Another suitable class of synthetic lubricating oils comprises the esters of dicarboxylic acids (e.g., phthalic acids, succinic acid, maleic acid, azelaic acid, suberic acid, sebacic acid, fumaric acid, adipic acid, etc.) with a variety of alcohols (e.g., butyl alcohol, hexyl alcohol, dodecyl alcohol, 2-ethylhexyl alcohol, etc.). Specific examples of these esters include dibutyl adipate, di-(2-ethylhexyl)sebacate, di-n-hexyl fumarate, dioctyl sebacate, diisooctyl azelate, dioctylphthalate, didecyl phthalate, dieicosyl sebacate, and the like. Other synthetic lubricating oils include liquid esters of phosphorus-containing acids (e.g., tricresyl phosphate, diethyl ester of decane phosphonic acid, etc.), alkyl diphenyl ethers; and polymerized tetrahydrofuranes. Silicone-based oils such as the polyalkyl-, polyaryl-, polyalkoxy-, and polyaryloxy-siloxane oils and silicate oils comprise another useful class of synthetic lubricants (e.g., tetraethyl silicate, tetraisopropyl silicate, tetra-2-ethylhexyl silicate, tetra(4-methyl-2-tetraethyl)silicate, tetra-p-tertbutylphenyl silicate, hexyl (4-methyl-2-phentoxy)disiloxane, poly(methyl)siloxanes, poly(methylphenyl)-siloxanes, etc.). This identification of certain oils is not intended to be inclusive but is merely illustrative of the type of base oils contemplated by this invention.

In fuels, the acylated nitrogen-containing reaction products of this invention promote engine cleanliness by reducing or eliminating harmful deposits in the engine fuel system, and exhaust system. Their presence promotes carburetor and fuel line cleanliness and reduces or eliminate the deposition of carbonaceous deposits in internal parts of the engine such as on exhaust parts and on burners in furnaces, etc. The reaction products are intended primarily for use in the normally liquid petroleum distillate fuels, that is, the petroleum distillates which boil in the range characteristic of petroleum fuels such as gasolines, fuel oils, diesel fuels, aviation fuels, kerosene, and the like. When employed in fuels, they are generally employed in much lower concentrations than in lubricants, for example, in amounts of from about 0.0001% to about 2% by weight and generally in amounts of from about 0.0001% to about 0.5% by weight. As in the case of lubricants, other conventional additives can be present in the fuel compositions contemplated by the present invention. Additional additives include lead scavengers, deicers, antiscreen-clogging agents, demulsifiers, smoke suppressants and the like.

The following are examples of the lubricating and fuel compositions contemplated by the present invention.

EXAMPLE A (1) SAE 30 mineral oil containing 1% of the final filtrate of Example 1(a) and 0.5% of the product of Example 8.

(2) SAE 40 mineral lubricating oil containing 3.5% of the final filtrate of Example 1(c).

EXAMPLE B

SAE 20 mineral oil containing 1.75% of the final filtrate of Example 2(a) and 0.15% of the zinc salt of an equimolar mixture of di-cyclohexylphosphorodithioic acid and di-isobutyl-phosphorodithioic acid.

EXAMPLE C

SAE 10W–30 mineral lubricating oil containing 4% of the final filtrate of Example 3.

EXAMPLE D

SAE 10W–30 mineral lubricating oil containing 1.5% of the final filtrate of Example 7(b), 0.075% of phosphorus as the adduct obtained by heating di-nonylphosphorodithioate with 0.25 mole of 1,2-hexene oxide at 100° C., a sulfurized methyl ester of tall oil acid having a sulfur content of 15%, 6% of a polyisobutene viscosity index improver having an average molecular weight of about 100,000, 0.005% of poly - (alkylmethacrylate) anti-foam agent, and 0.5% lard oil.

EXAMPLE E

SAE 20 mineral lubricating oil containing 2.5% of the final filtrate of Example 5(d), 0.75% of phosphorus as the dioctylphosphorodithioate, 2% of a barium detergent prepared by neutralizing with barium hydroxide a hydrolyzed reaction product of one mole of polypropylene (molecular weight 2000) with one mole of phosphorus pentasulfide and one mole of sulfur, 3% of a barium sulfonate detergent prepared by carbonating a mineral oil solution of mahogany acid and a 500% stoichiometrically excess amount of barium hydroxide in the presence of octylphenol as the promoter at 180° C., 3% of a supplemental ashless dispersant prepared by copolymerizing a mixture of 95% by weight of decylmethacrylate, 5% by weight of diethylaminoethyl acrylate.

EXAMPLE F

A di-2-ethylhexyl sebacate lubricating composition comprising 0.5% of the final filtrate of Example 5(a).

EXAMPLE G

Diesel fuel containing 0.1% of the final filtrate of Example 7(a).

EXAMPLE H

Kerosene containing 0.0003% of the final filtrate of Example 4.

EXAMPLE I

Gasoline containing 0.007% of the final filtrate of Example 5(c).

The foregoing compositions illustrate the types of lubricant and fuel compositions contemplated by the present invention. Many additional compositions apparent to those skilled in the art are available simply by replacing all or part of the acylated nitrogen-containing reaction products of Examples A–I with an equal amount of other acylated nitrogen-containing reaction products of the present invention. Obviously, optimum amounts for any application will depend upon the particular additive or additive combination selected, the specific fuel or lubricant, and the specific environment in which the fuel or lubricant is to be used. These optimum amounts can be ascertained through conventional evaluation techniques commonplace in the industry.

What is claimed is:

1. A process comprising reacting at a temperature of at least 80° C. (a) N equivalents of at least one high molecular weight aliphatic polycarboxylic acid acylating agent containing at least about fifty aliphatic carbon atoms with (b) M equivalents of at least one alkylene polyamine where $N>M$ to produce an acylated alkylene polyamine-containing reaction mixture and then contacting at a temperature of at least 80° C. said reaction mixture with (c) at least $N-M$ equivalents of at least one alcohol selected from the class consisting of polyhydric alkanols containing at least three hydroxy groups, and polyhydroxy-substituted aliphatic primary amines, wherein the ratio $M/N$ is characterized by a numerical value of about 0.1 to about 0.9.

2. A process according to claim 1 wherein the ratio of $M/N$ is characterized by a numerical value of about 0.2 to about 0.8.

3. A process according to claim 1 wherein said acylating agent is a polyolefin-substituted succinic acid acylating agent selected from the class consisting of the acid per se and the acid anhydride wherein the polyolefin substituent has an average molecular weight of about 700 to about 5000.

4. A process according to claim 3 wherein said polyhydric alcohol is a polyhydric alkanol having four to six hydroxy groups and up to ten carbon atoms.

5. A process according to claim 4 wherein said polyhydric alkanol is at least one member selected from the class consisting of pentaerythritol, mannitol, and sorbitol.

6. A process according to claim 3 wherein said polyhydric alcohol is a polyhydroxy-substituted aliphatic primary monoamine containing up to ten carbon atoms and six hydroxy groups.

7. A process according to claim 6 wherein said polyhydroxy-substituted aliphatic primary monoamine is an amine corresponding to the formula $R_aNH_2$ where $R_a$ is a polyhydroxy-substituted alkyl group.

8. An acylated nitrogen-containing composition produced according to the process of claim 1.

9. A fuel comprising a major amount of a normally liquid petroleum distillate fuel and from about 0.0001% to about 2% by weight of the acylated nitrogen composition of claim 8.

10. A lubricant comprising a major amount of a lubricating oil and from about 0.01% to about 30% by weight of an acylated nitrogen composition according to claim 8.

11. An acylated nitrogen-containing composition produced according to the process of claim 2.

12. An acylated nitrogen-containing composition produced according to the process of claim 3.

13. An acylated nitrogen-containing composition produced according to the process of claim 4.

14. A fuel comprising a major amount of a normally liquid petroleum distillate fuel and from about 0.0001% to about 0.5% by weight of the acylated nitrogen composition of claim 13.

15. A lubricant comprising a major amount of a lubricating oil and from about 0.01% to about 30% by weight of the acylated nitrogen-containing composition of claim 13.

16. An acylated nitrogen-containing composition produced according to the process of claim 5.

17. An acylated nitrogen-containing composition produced according to the process of claim 6.

18. A fuel comprising a major amount of a normally liquid petroleum distillate fuel and from about 0.0001% to about 2% by weight of the acylated nitrogen composition of claim 17.

19. A lubricant comprising a major amount of a lubricating oil and from about 0.01% to about 30% by weight of an acylated nitrogen composition produced according to claim 17.

20. An acylated nitrogen-containing composition produced according to the process of claim 7.

References Cited

UNITED STATES PATENTS 3,184,474   5/1965   Catto et al. _____ 252—51.5 A

DANIEL E. WYMAN, Primary Examiner

W. J. SHINE, Assistant Examiner

U.S. Cl. X.R.

44—63, 71; 260—268, 326.5